(12) United States Patent
Wang et al.

(10) Patent No.: US 8,791,384 B2
(45) Date of Patent: Jul. 29, 2014

(54) HYBRID WELDING METHOD AND HYBRID WELDING APPARATUS

(75) Inventors: Jingbo Wang, Hyogo (JP); Hitoshi Nishimura, Osaka (JP)

(73) Assignee: Panasonic Corporation, Osaka (JP)

( * ) Notice: Subject to any disclaimer, the term of this patent is extended or adjusted under 35 U.S.C. 154(b) by 337 days.

(21) Appl. No.: 13/057,834

(22) PCT Filed: Aug. 5, 2009

(86) PCT No.: PCT/JP2009/003731
§ 371 (c)(1),
(2), (4) Date: Feb. 7, 2011

(87) PCT Pub. No.: WO2010/021094
PCT Pub. Date: Feb. 25, 2010

(65) Prior Publication Data
US 2011/0132878 A1 Jun. 9, 2011

(30) Foreign Application Priority Data
Aug. 19, 2008 (JP) .................................. 2008-210423

(51) Int. Cl.
*B23K 9/00* (2006.01)
*B23K 26/14* (2014.01)
(52) U.S. Cl.
CPC ................................ *B23K 26/1423* (2013.01)
USPC .......................................................... 219/74
(58) Field of Classification Search
USPC ............. 219/74, 121.63, 136, 137 R, 121.11, 219/137.2, 121.13, 121.45
See application file for complete search history.

(56) References Cited

U.S. PATENT DOCUMENTS

| 4,390,774 | A | * | 6/1983 | Steen et al. ............... 219/121.84 |
| 6,111,214 | A | * | 8/2000 | Saito ......................... 219/121.63 |
| 6,469,277 | B1 | * | 10/2002 | Trube et al. ................ 219/137 R |
| 6,786,101 | B2 | * | 9/2004 | Iwai et al. ........................ 73/850 |
| 2005/0011868 | A1 | * | 1/2005 | Matile et al. .............. 219/121.64 |
| 2005/0284853 | A1 | * | 12/2005 | Takahashi et al. ......... 219/130.4 |
| 2006/0207983 | A1 | * | 9/2006 | Myers et al. ............. 219/137 PS |
| 2007/0251927 | A1 | * | 11/2007 | Miessbacher et al. ... 219/121.63 |
| 2008/0011727 | A1 | * | 1/2008 | Peters ........................ 219/130.5 |
| 2009/0095720 | A1 | | 4/2009 | Kamei | |

FOREIGN PATENT DOCUMENTS

| JP | 53-137044 | 11/1978 |
| JP | 59-066991 | 4/1984 |
| JP | 60-8916 | 3/1985 |
| JP | 60-106688 | 6/1985 |

(Continued)

OTHER PUBLICATIONS

JP 2001-246485, Kenji, Laser/Arc Composite Welding Equipment ; Japanese Reference—2001.*

(Continued)

*Primary Examiner* — Dana Ross
*Assistant Examiner* — Renee L Miller
(74) *Attorney, Agent, or Firm* — RatnerPrestia

(57) ABSTRACT

Disclosed is a method for hybrid welding in which a laser beam is applied to the welding position of objects to be welded, and at the same time, a first wire is fed to the welding position so as to perform arc welding using an arc generated between the objects to be welded and the first wire. In this method, one or more second wires are fed to a molten weld pool formed by the laser beam and arc welding, thereby increasing the amount of welding without increasing the arc current.

23 Claims, 16 Drawing Sheets

(56) References Cited

FOREIGN PATENT DOCUMENTS

| | | |
|---|---|---|
| JP | 2001-246465 A | 9/2001 |
| JP | 2001-246485 A | 9/2001 |
| JP | 2002-035968   | 2/2002 |
| JP | 2002-035968 A | 2/2002 |
| JP | 2002-178177 A | 6/2002 |
| JP | 2005-238301 A | 9/2005 |
| JP | 2006-224130 A | 8/2006 |
| JP | 2007-216275 A | 8/2007 |
| JP | 2007-283356 A | 11/2007 |
| JP | 2008-093718   | 4/2008 |

OTHER PUBLICATIONS

International Search Report for International Application No. PCT/JP2009/003731, Nov. 17, 2009, Panasonic Corporation.

Masayuki Ikeda, Tomoo Fujioka, Yasuhiro Horiike, Hiroshi Maruo, and Shogo Yoshikawa, "Reeza Purosesu Gijutsu Handobukku" [laser processing technology handbook] (Asakura Publishing Co., Ltd. Tokyo 1992), p. 149 (with English abstract).

Takayoshi Ohji, "Yousetsu/Setsugou Purosesu no Kiso" [Basis of welding and junction process] (Sanpo Publications Inc. Tokyo 1996), p. 128 (with English abstract).

* cited by examiner

HYBRID WELDING METHOD AND HYBRID WELDING APPARATUS

This Application is a U.S. National Phase Application of PCT International Application PCT/2009/003731.

TECHNICAL FIELD

The present invention relates to a method and apparatus for hybrid welding in which a laser beam and arc welding are applied at the same time to the objects to be welded.

BACKGROUND ART

Laser welding using a laser beam having a high energy density is a high speed welding process with a small heat-affected zone. When there is a gap between the objects to be welded, however, the laser beam may pass through the gap, causing energy loss and resulting in defective welding.

To solve this problem, it has been suggested to use laser welding with a filler wire (see, Non-Patent Literature 1), or hybrid welding in which laser welding is combined with consumable or non-consumable electrode arc welding (see, Patent Literature 1). In the hybrid welding in which laser welding is combined with non-consumable electrode arc welding (TIG welding: tungsten inert gas welding), a filler wire is added to a welding area while a tungsten electrode, which is a TIG electrode, is vibrated, thereby obtaining a good weld (see, Patent Literature 2). When TIG welding is used, however, the tungsten electrode having a high melting point, may be burned out or consumed during welding, causing an unstable arc. Moreover, the consumed tungsten electrode may be incorporated into the weld metal, causing degradation in performance of the weld joint.

In the hybrid welding in which laser welding is combined with the consumable electrode arc welding (see, Patent Literatures 3 and 4), a wire can be added to a welding area without using a tungsten electrode, thereby achieving deep penetration welding. To achieve high speed machining and small melt width, in the hybrid welding using the consumable electrode arc welding, it is suggested to arrange arc welding electrodes in front of and behind the laser beam in the direction of welding (see, Patent Literature 5). The arc welding electrodes are MIG (metal inert gas) welding electrodes (wires). It is impossible, however, to adjust the feed speed of the wires and the MIG welding arc current independently of each other (see, Non-Patent Literature 2). In general, the arc current increases with increasing wire feed speed. Therefore, in the case of requiring a high deposited metal amount in the welding of sheet metals having a gap therebetween, a high wire feed speed is required, but this results in a high arc current, possibly causing burn-through.

FIGS. 16A and 16B are schematic diagrams showing conventional laser butt welding and conventional hybrid butt welding, respectively. FIG. 16A shows the conventional laser butt welding.

As shown in FIG. 16A, laser beam 1 is used to weld gap 3 between the butting surfaces of objects-to-be-welded 2. Welding objects-to-be-welded 2 together using laser beam 1 results in bead 4. When gap 3 is narrow or the welding speed is low, good bead 4 is obtained. When gap 3 is wide or the welding speed is high, laser beam 1 may pass through gap 3, causing bead 4 to have burn-through 5.

FIG. 16B shows the hybrid butt welding using conventional consumable electrode arc welding. As shown in FIG. 16B, arc 7 is generated between wire 6 and objects-to-be-welded 2, and melts the tip of wire 6, thereby forming droplet 8. Laser beam 1 and arc 7 together form molten weld pool 9 at the butt joint of objects-to-be-welded 2. Partial solidification of molten weld pool 9 results in bead 10. The hybrid welding shown in FIG. 16B allows wire 6 to be added, so that allowable gap 3 can be wider than in the laser welding of FIG. 16A. When gap 3 is larger than the allowable range or the welding speed is too high, however, bead 10 may be formed discontinuously with burn-through 11 at its center. In such a case, even when the feed amount of wire 6 is increased to fill gap 3, burn-through 11 still can occur. The reason for the occurrence of burn-through 11 is as follows. In general arc welding, wire 6 cannot be increased without being accompanied by an increase in the arc current. This increases heat input to objects-to-be-welded 2 and the size of molten weld pool 9 until it is too large to be held only by the surface tension generated around pool 9.

CITATION LIST

Patent Literature

Patent Literature 1: Japanese Patent Unexamined Publication No. S53-137044
Patent Literature 2: Japanese Patent Unexamined Publication No. 2002-178177
Patent Literature 3: Japanese Patent Examined Publication No. S60-8916
Patent Literature 4: Japanese Patent Unexamined Publication No. S59-66991
Patent Literature 5: Japanese Patent Unexamined Publication No. 2001-246485

Non-Patent Literature

Non-Patent Literature 1: Masayuki Ikeda, Tomoo Fujioka, Yasuhiro Horiike, Hiroshi Maruo, and Shogo Yoshikawa, "Reeza Purosesu Gijutsu Handobukku" [laser processing technology handbook] (Asakura Publishing Co., Ltd. Tokyo 1992), p 149
Non-Patent Literature 2: Takayoshi Ohji, "Yousetsu/Setsugou Purosesu no Kiso" [Basis of welding and junction process] (Sanpo Publications Inc. Tokyo 1996), p 128

SUMMARY OF THE INVENTION

To solve these conventional problems, the present invention provides a method and apparatus for hybrid welding in which one or more wires are fed to a molten weld pool formed by the application of a laser beam and arc welding, thereby increasing the deposition rate without increasing the arc current.

The method according to the present invention is a method for hybrid welding in which a laser beam is applied to the welding position of the objects to be welded, and at the same time, a first wire is fed to the welding position so as to perform arc welding using an arc generated between the objects to be welded and the first wire. This method includes feeding at least one second wire to a molten weld pool formed by the laser welding and the arc welding.

The above-described method can increase the deposition rate without increasing the arc current.

The apparatus for hybrid welding according to the present invention includes a laser generator, a first-wire feeder, an arc generator, a second-wire feeder, and a controller for controlling the laser generator, the arc generator, and the second-wire feeder. A second wire is fed to a molten weld pool formed by arc welding and a laser beam, the molten weld pool being formed in the area between a first wire and the objects to be welded. The laser generator applies a laser beam to the welding position of the objects to be welded. The first-wire feeder feeds a first wire to the welding position via a first torch. The arc generator supplies electric power required for arc welding to the first wire and the objects to be welded. The second-wire feeder feeds at least one second wire to the welding position via at least one second torch.

With the above-described apparatus, the deposition rate can be increased without increasing the arc current.

The apparatus for hybrid welding according to the present invention may include a laser generator, a first-wire feeder, a second-wire feeder, an arc generator, and a controller. The laser generator applies a laser beam to the welding position of the objects to be welded. The first-wire feeder feeds a first wire to the welding position via a first torch. The second-wire feeder feeds a second wire to the welding position via a second torch. The arc generator controls the first-wire feeder, and supplies electric power required for arc welding to the first wire and the objects to be welded. The controller also receives predetermined periods: $\Delta T1$, $\Delta T2$, and $\Delta T3$ from a time setting part and a current detection signal from a current detector, thereby controlling the laser generator, the arc generator, and the second-wire feeder.

At the time of starting welding, the controller performs the following: controlling the arc generator to start arc welding; controlling the laser generator to start the application of the laser beam immediately upon receiving the current detection signal; and controlling the second-wire feeder to start the feeding of the second wire when the predetermined period $\Delta T1$ has passed.

At the time of ending the welding, the controller performs the following: ending the application of the laser beam when the predetermined period $\Delta T2$ has passed since the feeding of the second wire is stopped; and ending the arc welding when the predetermined period $\Delta T3$ has passed since the application of the laser beam is ended.

The above-described apparatus can provide good arc starting and a good weld bead shape.

The apparatus for hybrid welding according to the present invention may include a laser generator, a first-wire feeder, a second-wire feeder, an arc generator, and a controller. The laser generator applies a laser beam to the welding position of the objects to be welded. The first-wire feeder feeds a first wire to the welding position via a first torch. The second-wire feeder feeds a second wire to the welding position via a second torch. The arc generator controls the first-wire feeder, and supplies electric power required for arc welding to the first wire and the objects to be welded. The controller receives predetermined periods: $\Delta T1$, $\Delta T2$, and $\Delta T3$ from a time setting part, a current detection signal from a current detector, and an arc voltage detection signal from a voltage detector, thereby controlling the laser generator, the arc generator, and the second-wire feeder.

At the time of starting welding, the controller performs the following: controlling the laser generator to start the application of the laser beam; controlling the arc generator to start arc welding when the predetermined period $\Delta T1$ has passed; and controlling the second-wire feeder to start the feeding of the second wire immediately upon receiving the current detection signal and the arc voltage detection signal.

At the time of ending the welding, the controller performs the following: ending the application of the laser beam when the predetermined period $\Delta T2$ has passed since the feeding of the second wire is stopped; and ending the arc welding when the predetermined period $\Delta T3$ has passed since the application of the laser beam is ended.

The above-described apparatus can provide good arc starting and a good weld bead shape.

DETAILED DESCRIPTION OF PREFERRED EMBODIMENTS

Figure 1:
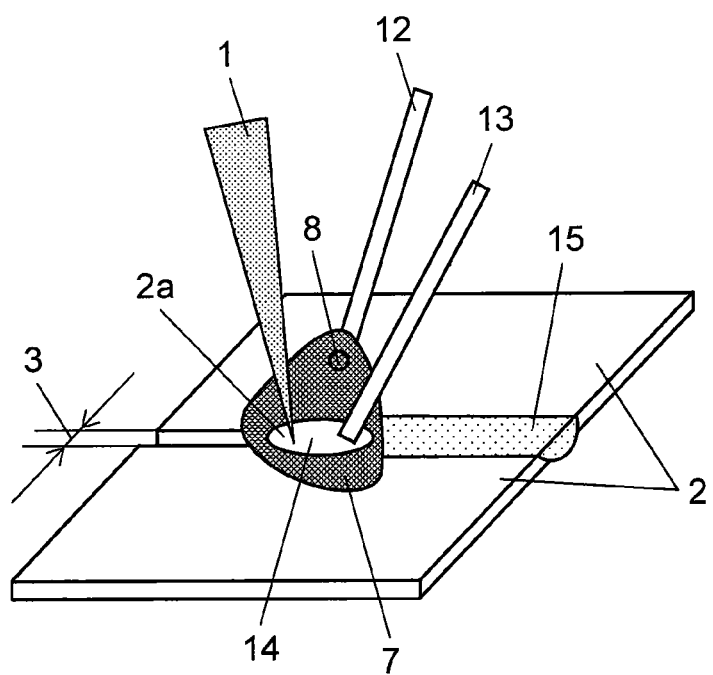
FIG. 1 is a schematic diagram showing a method for hybrid welding according to a first exemplary embodiment of the present invention.

Exemplary embodiments of the present invention will be described as follows with reference to drawings. In the second to fourth exemplary embodiments, like components are labeled with like reference numerals with respect to the preceding exemplary embodiments, and hence, the description thereof will be omitted.

First Exemplary Embodiment

Figure 16A:
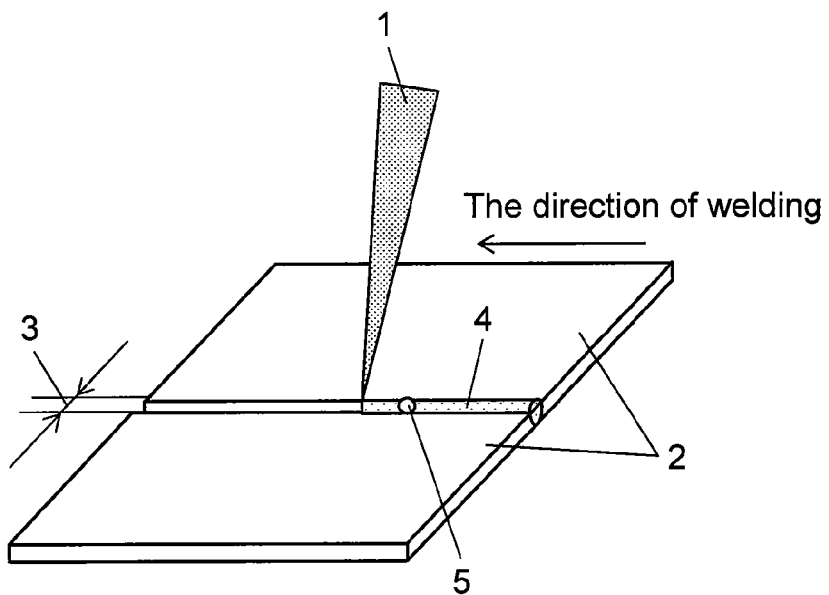
FIG. 16A is a schematic diagram showing conventional laser butt welding.
Figure 16B:
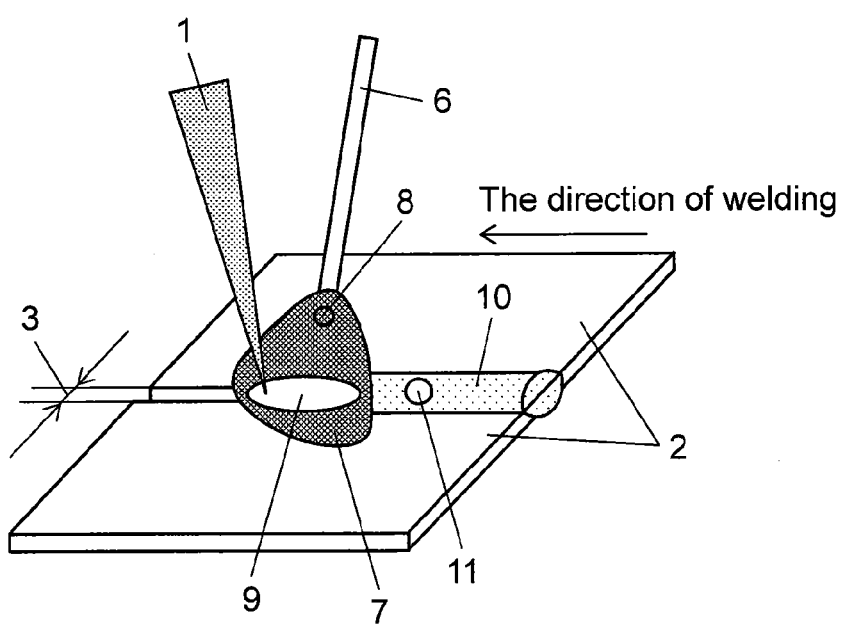
FIG. 16B is a schematic diagram showing conventional hybrid butt welding.

FIG. 1 is a schematic diagram showing a method for hybrid welding according to a first exemplary embodiment of the present invention. Like components are labeled with like reference numerals with respect to FIGS. 16A and 16B, and the following description will be mainly focused on features different from FIGS. 16A and 16B.

As shown in FIG. 1, laser welding and arc welding are applied at the same time to objects-to-be-welded 2. The laser welding is performed by applying laser beam 1 to welding position 2a of the butt joint of objects-to-be-welded 2. The arc welding is performed by feeding first wire 12 to welding position 2a and generating arc 7 between the first wire and objects-to-be-welded 2. At the same time, second wire 13 is fed to molten weld pool 14 formed by laser beam 1 and arc 7. Solidification of molten weld pool 14 results in bead 15. FIG. 1 contains one second wire 13, but alternatively, two or more second wires 13 may be fed to molten weld pool 14 as long as they can be melted.

Figure 2A:
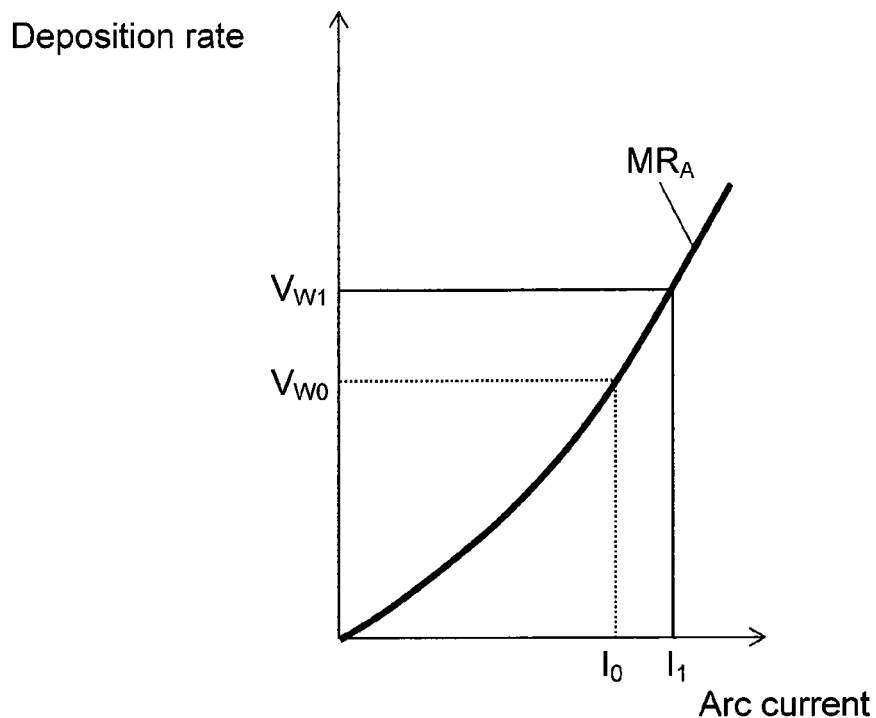
FIG. 2A is a schematic diagram showing the relation between the deposition rate and the arc current in conventional consumable electrode arc welding.
Figure 2B:
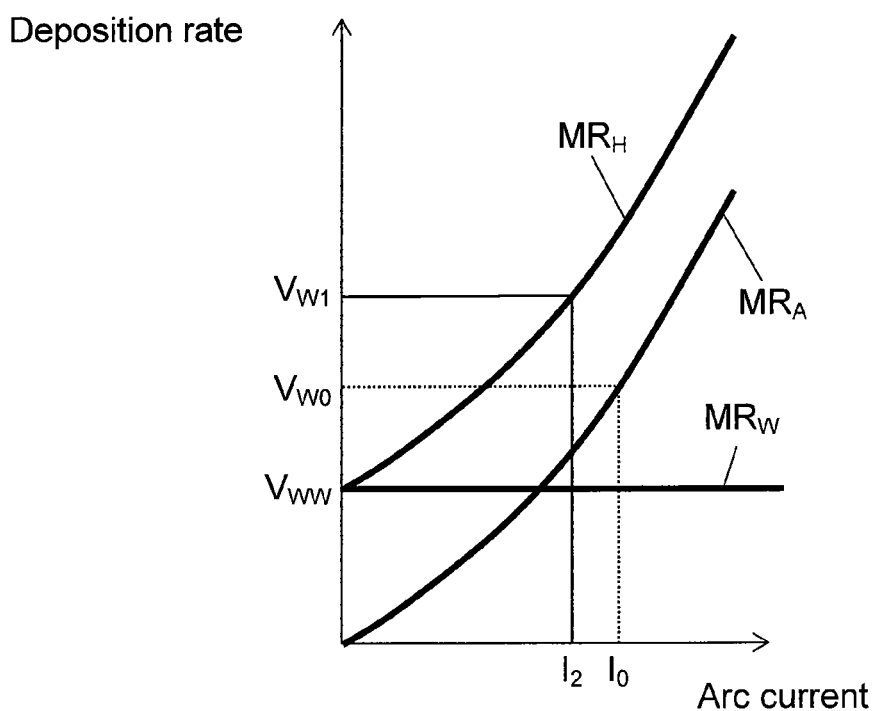
FIG. 2B is a schematic diagram showing the relation between the deposition rate and the arc current in the method for hybrid welding according to the first exemplary embodiment of the present invention.

FIG. 2A is a schematic diagram showing the relation between the deposition rate and the arc current in the conventional consumable electrode arc welding. FIG. 2B is a schematic diagram showing the relation between the deposition rate and the arc current in the method for hybrid welding according to the first exemplary embodiment of the present invention.

The principle of the method for hybrid welding shown in FIG. 1 will be described as follows with reference to FIGS. 2A and 2B. FIG. 2A contains a melting curve $MR_A$, which shows the relation between the arc current and the deposition rate of a melted wire in the consumable arc welding. According to the melting curve $MR_A$, when the deposition rate is $V_{W0}$, the arc current is $I_0$. Therefore, in the case where objects-to-be-welded 2 shown in FIG. 1 have a wide gap 3 therebetween, if the amount of welding $V_{W0}$ shown in FIG. 2A is increased to $V_{W1}$ in order to fill gap 3, then the arc current $I_0$ increases to $I_1$. This causes an increase in both the size of molten weld pool 14 and the arc force applied thereto, making burn-through more likely to occur.

FIG. 2B, on the other hand, contains a melting curve $MR_W$, which shows the deposition rate of second wire 13 fed to molten weld pool 14. When second wire 13 is fed to molten weld pool 14 at a constant rate, a constant deposition rate $V_{WW}$ can be obtained regardless of the arc current. Therefore, a melting curve $MR_H$ in the hybrid welding with laser and arc can be obtained by adding the melting curves $MR_A$ and $MR_W$. The total deposition rate can be changed by changing only the feed speed of second wire 13 corresponding to the deposition rate $V_{WW}$ without changing the arc current. In the case where objects-to-be-welded 2 shown in FIG. 1 have a wide gap 3 therebetween, if second wire 13 is fed so as to have the deposition rate $V_{WW}$, the arc current $I_0$ has to be reduced to I2 as shown in FIG. 2B so that the deposition rate $V_{W0}$ at which the second wire is not fed can be changed to $V_{W1}$. Thus, the hybrid welding shown in FIG. 1 can increase the deposition rate without increasing the arc current, thereby obtaining a good bead even with a wide gap 3.

Thus, the method for hybrid welding of the present first exemplary embodiment is a method for hybrid welding in which laser beam 1 is applied to welding position 2a of objects-to-be-welded 2, and at the same time, first wire 12 is fed to welding position 2a so as to perform arc welding using an arc generated between objects-to-be-welded 2 and the first wire. In this method, one or more second wires 13 are fed to molten weld pool 9 formed by laser welding using laser beam 1 and arc welding.

This method can increase the deposition rate without increasing the arc current.

The above description shows one second wire 13, but alternatively, two or more second wires 13 may be used.

In the above description, laser beam 1 is applied to the front of the direction of welding, first wire 12 is fed behind laser beam 1, and second wire 13 is fed behind first wire 12 (see FIG. 1). The "front" is the direction toward which objects-to-be-welded 2 are laser-welded, and the "behind" is the direction in which objects-to-be-welded 2 have been laser-welded.

The above-described method can increase the deposition rate without increasing the arc current.

Figure 3A:
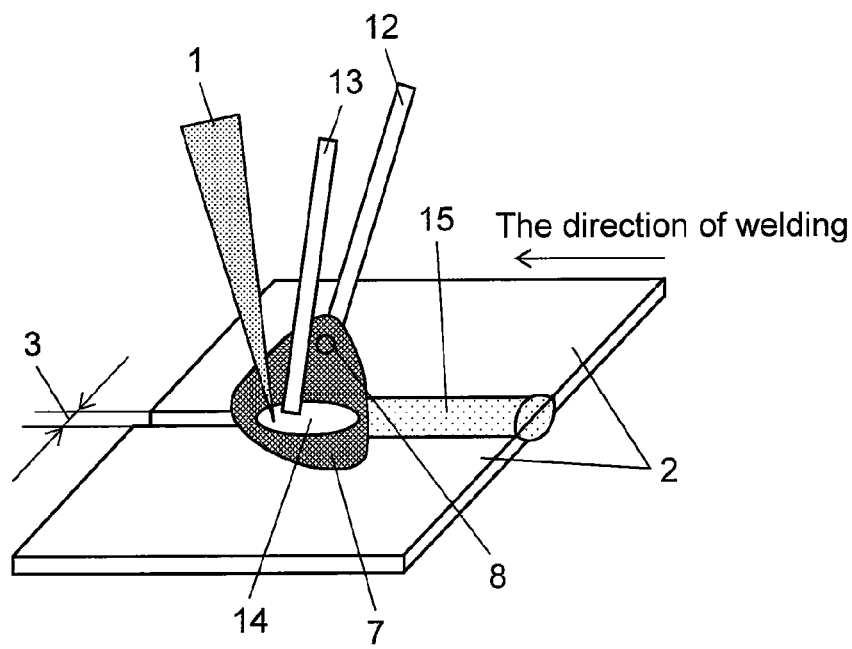
FIG. 3A is a schematic diagram showing the position to which a second wire is fed in the method for hybrid welding according to the first exemplary embodiment of the present invention.
Figure 3B:
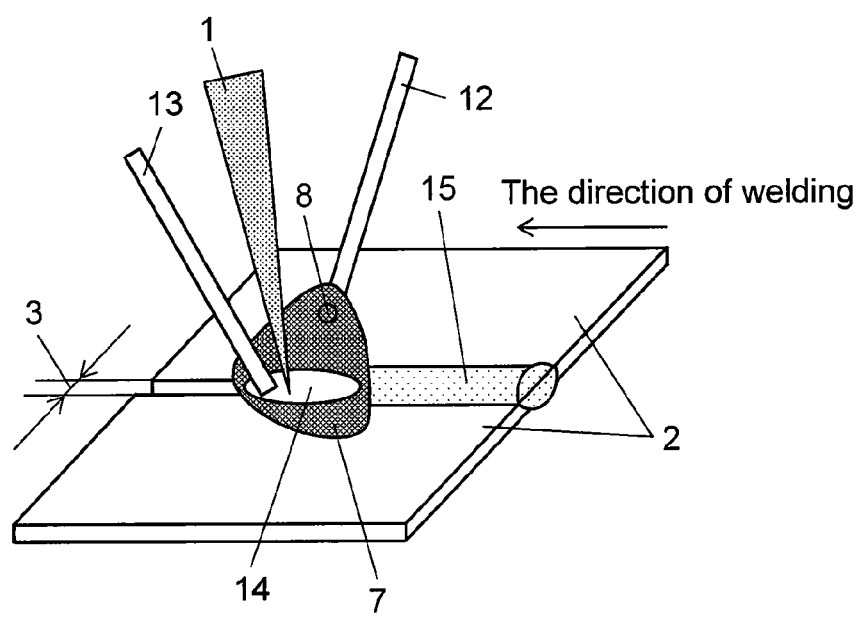
FIG. 3B is another schematic diagram showing the position to which the second wire is fed in the method for hybrid welding according to the first exemplary embodiment of the present invention.

FIGS. 3A and 3B are schematic diagrams showing the position to which second wire 13 is fed in the method for hybrid welding according to the first exemplary embodiment.

As shown in FIG. 3A, it is alternatively possible that laser beam 1 is applied to the front of the direction of welding, first wire 12 is fed behind laser beam 1, and second wire 13 is fed between laser beam 1 and first wire 12. As shown in FIG. 3B, it is alternatively possible that laser beam 1 is applied to the front of the direction of welding, first wire 12 is fed behind laser beam 1, and second wire 13 is fed ahead of laser beam 1.

The above-described method can increase the deposition rate without increasing the arc current.

Figure 4A:
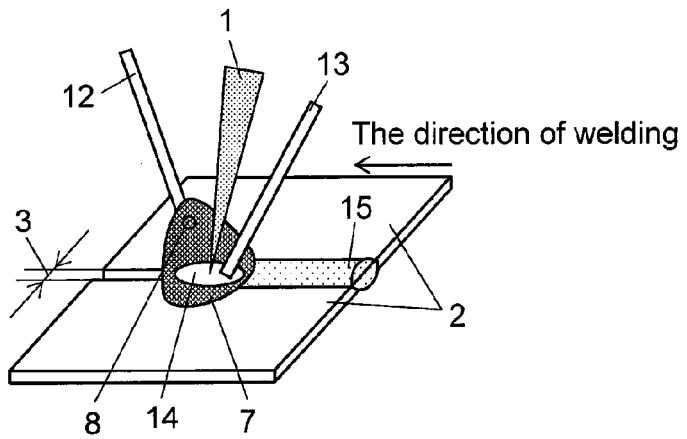
FIG. 4A is another schematic diagram showing the position to which the second wire is fed in the method for hybrid welding according to the first exemplary embodiment of the present invention.
Figure 4B:
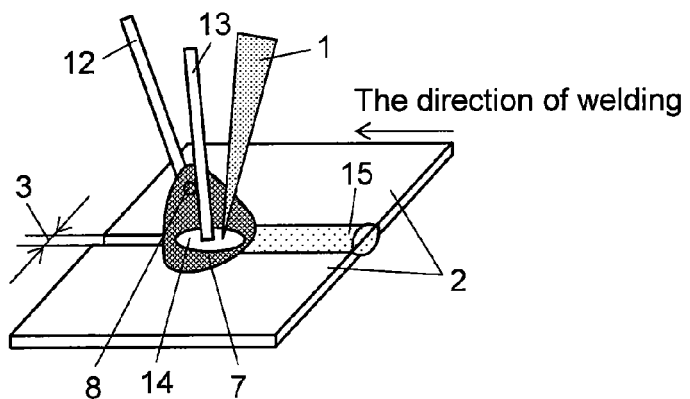
FIG. 4B is another schematic diagram showing the position to which the second wire is fed in the method for hybrid welding according to the first exemplary embodiment of the present invention.
Figure 4C:
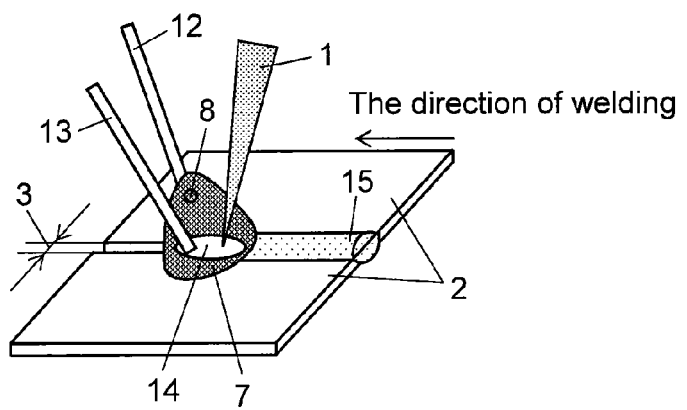
FIG. 4C is another schematic diagram showing the position to which the second wire is fed in the method for hybrid welding according to the first exemplary embodiment of the present invention.
Figure 5A:
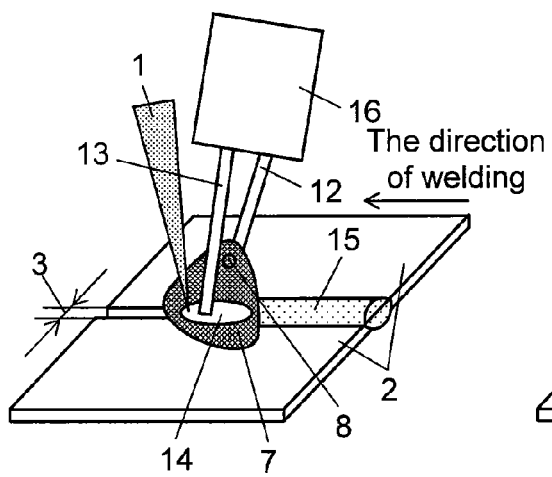
FIG. 5A is a schematic diagram showing how to feed the first wire and the second wire in the method for hybrid welding according to the first exemplary embodiment of the present invention.
Figure 5B:
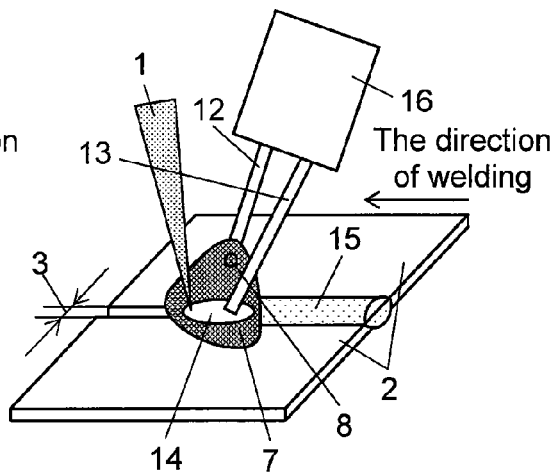
FIG. 5B is another schematic diagram showing how to feed the first wire and the second wire in the method for hybrid welding according to the first exemplary embodiment of the present invention.
Figure 5C:
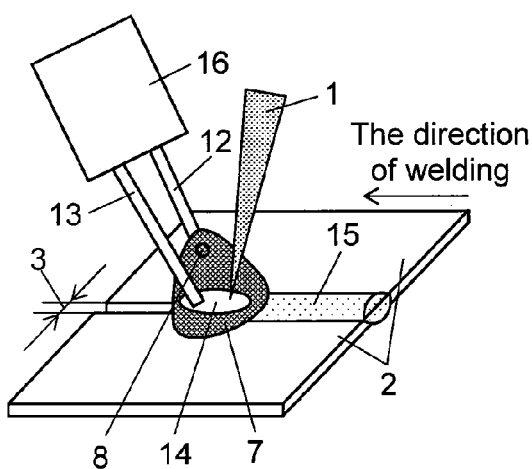
FIG. 5C is another schematic diagram showing how to feed the first wire and the second wire in the method for hybrid welding according to the first exemplary embodiment of the present invention.
Figure 5D:
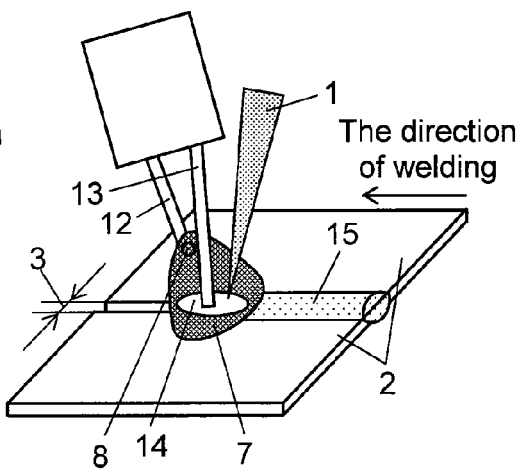
FIG. 5D is another schematic diagram showing how to feed the first wire and the second wire in the method for hybrid welding according to the first exemplary embodiment of the present invention.

FIGS. 4A, 4B, and 4C are other schematic diagrams showing the position to which second wire 13 is fed in the method for hybrid welding according to the first exemplary embodiment.

As shown in FIG. 4A, it is alternatively possible that first wire 12 is fed to the front of the direction of welding, laser beam 1 is applied behind first wire 12, and second wire 13 is fed behind laser beam 1. As shown in FIG. 4B, it is alternatively possible that first wire 12 is fed to the front of the direction of welding, laser beam 1 is applied behind first wire 12, and second wire 13 is fed between first wire 12 and laser beam 1. As shown in FIG. 4C, it is alternatively possible that first wire 12 is fed to the front of the direction of welding, laser beam 1 is applied behind first wire 12, and second wire 13 is fed ahead first wire 12.

In FIGS. 1, 3A to 3B, and 4A to 4C, the optical axis of laser beam 1, the central axis of first wire 12, and the central axis of second wire 13 are non-coaxial. Alternatively, although not illustrated, the central axis of first wire 12 and/or second wire 13 may be made coaxial with the optical axis of laser beam 1.

The above-described method can increase the deposition rate without increasing the arc current.

Although not described above or illustrated, the arc welding may use a shielding gas which is supplied through a first nozzle of a first torch for feeding first wire 12 and/or a second nozzle of a second torch for feeding second wire 13. Alternatively, the arc welding may use different shielding gases of different compositions which are supplied through the first and second nozzles.

Obviously, the supply operation of the shielding gases may be performed individually between the first and second nozzles according to the welding area. When the supply of the shielding gases is stopped or resumed, it is possible to change the laser-beam-1 application conditions and/or the arc welding conditions. Alternatively, the shielding gas may be supplied through a composite nozzle of a composite torch for concurrently feeding first and second wires 12 and 13, which will be described as follows with reference to FIGS. 5A to 5D.

FIGS. 5A to 5D are schematic diagrams showing how to feed first and second wires 12 and 13 in the method for hybrid welding according to the first exemplary embodiment.

FIGS. 5A to 5D contain composite nozzle 16, which is omitted in FIGS. 3A to 3B or 4A to 4C. Composite nozzle 16 is attached to the tip of the composite torch for concurrently feeding first and second wires 12 and 13. In FIGS. 5A to 5D, the shielding gases are supplied through composite nozzle 16 for feeding first and second wires 12 and 13. It is obvious that the composite torch may feed first and second wires 12 and 13 at the same or different speeds.

Although not described above, first and second wires 12 and 13 may be made of either the same material or different materials of the same principal component. Obviously, the principal component of first and second wires 12 and 13 and objects-to-be-welded 2 may be aluminum or iron.

Although not described above, in the case of using two or more second wires 13 in the method for hybrid welding, the feeding of at least one of second wires 13 may be stopped according to the welding area. When the feeding of at least one of second wires 13 is stopped or resumed later, it is possible to change at least one of the following: the laser-beam-1 application conditions, the arc welding conditions, and the feed speed of at least one of second wires 13 that is being fed.

It is also possible to stop either the application of laser beam 1 or the arc welding according to the welding area. When either the application of laser beam 1 or the arc welding is stopped or resumed, it is possible to change at least one of the following: the laser-beam-1 application conditions, the feed speed of first wire 12, and the feed speed of at least one of second wires 13. It is also possible to change the feed speed of at least one of second wires 13 and/or the welding speed according to the welding area. In that case, it is possible to change the laser-beam-1 application conditions and/or the arc welding conditions.

Laser beam 1 used in the above-described method for hybrid welding may be replaced by plasma arc, although it will not be illustrated in detail.

The arc welding used in the above description may be pulse arc welding.

Second Exemplary Embodiment

Figure 6:
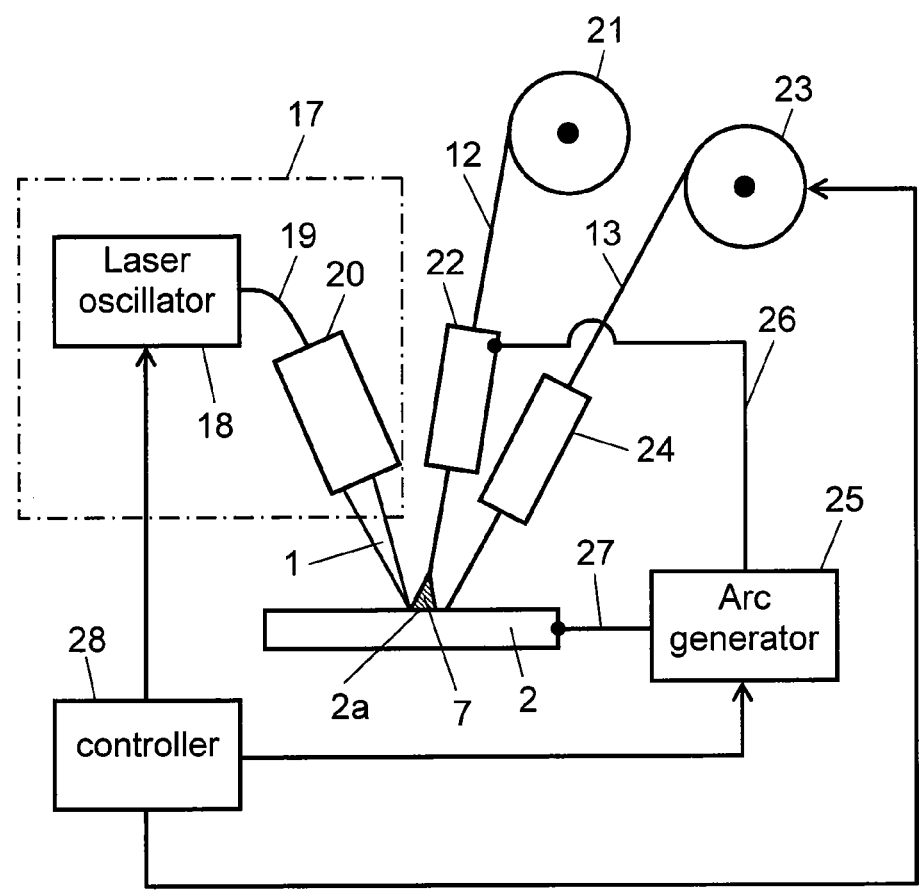
FIG. 6 is a schematic diagram showing an apparatus for hybrid welding according to a second exemplary embodiment of the present invention.

FIG. 6 is a schematic diagram showing an apparatus for hybrid welding according to a second exemplary embodiment of the present invention. Like components are labeled with like reference numerals with respect to FIG. 1 to FIGS. 5A-5D and the following description will be mainly focused on features different from FIG. 1 to FIGS. 5A-5D.

As shown in FIG. 6, laser generator 17 includes laser oscillator 18, laser transmitter 19, and light collection optical system 20, thereby applying laser beam 1 to welding position 2a of objects-to-be-welded 2. Laser transmitter 19 may be either an optical fiber or an optical transmission system composed of a plurality of lenses. Light collection optical system 20 may be composed of one or more lenses. First wire 12 is fed to welding position 2a of objects-to-be-welded 2 through first torch 22 from first-wire feeder 21. Arc generator 25 supplies electric power to first torch 22 and objects-to-be-welded 2 through cables 26 and 27 connected thereto, respectively.

At the time of starting welding, arc generator 25 controls first-wire feeder 21 to feed first wire 12 toward welding position 2a of objects-to-be-welded 2 through first torch 22. Arc generator 25 also controls first wire 12 and objects-to-be-welded 2 to generate arc 7 therebetween. At the time of ending the welding, arc generator 25 controls first-wire feeder 21 to stop the feeding of first wire 12 and the generation of arc 7. Second wire 13 is fed from second-wire feeder 23 through second torch 24 to a molten weld pool, which is formed in welding position 2a of objects-to-be-welded 2 by laser beam 1 and arc 7.

Although not illustrated, controller 28 controls the operation of each component upon receiving an external command to start or end welding. More specifically, controller 28 controls the start and end of the application of laser beam 1 from laser generator 17, the start and end of the discharge of arc 7 from arc generator 25, and the start and stop of the feeding of second wire 13 from second-wire feeder 23. Controller 28 may be a computer or composed of a component, a device, an apparatus, or a combination thereof having a calculation function like a computer.

Alternatively, controller 28 may be a robot. In this case, although not described in detail, light collection optical system 20 and first and second torches 22, 24 may be fixed to a manipulator of the robot. Laser oscillator 18 outputs a predetermined output value, but may alternatively receive a signal indicating the output value set by controller 28 and outputs the signal. In the same manner as the output of laser generator 17, the output of arc generator 25 is controlled by controller 28. Furthermore, the feed speed of second-wire feeder 23 and the start and stop of its feeding are controlled by controller 28.

The apparatus for hybrid welding shown in FIG. 6 operates as follows. At the time of starting welding, upon receiving a command to start welding, controller 28 transmits a signal to start laser welding to laser generator 17 so as to start the application of laser beam 1. The controller 28 also transmits a signal to start arc welding to arc generator 25 so as to start arc discharge, and also transmits a signal to start feeding the wire to second-wire feeder 23. At the time of ending the welding, upon receiving a command to end welding, controller 28 transmits a signal to end laser welding to laser generator 17 so as to end the application of laser beam 1. Controller 28 also transmits a signal to end arc welding to arc generator 25 so as to end arc discharge, and also transmits a signal to end feeding the wire to second-wire feeder 23 so as to end the welding.

Although not described above, laser beam 1, first wire 12, and second wire 13 can be arranged in the same manner as shown in FIG. 1 to FIGS. 5A-5D.

As described hereinbefore, in the method for hybrid welding according to the present second exemplary embodiment in which the application of laser beam 1 and arc welding are performed at the same time, second wire 13 is fed to molten weld pool 14 formed by laser beam 1 and arc welding. This increases the deposition rate without increasing the arc current.

The above description shows one second wire 13, but alternatively, two or more second wires 13 may be used. In this case, it goes without saying that two or more wire feeders and torches are provided to feed respective second wires 13.

Third Exemplary Embodiment

Figure 7:
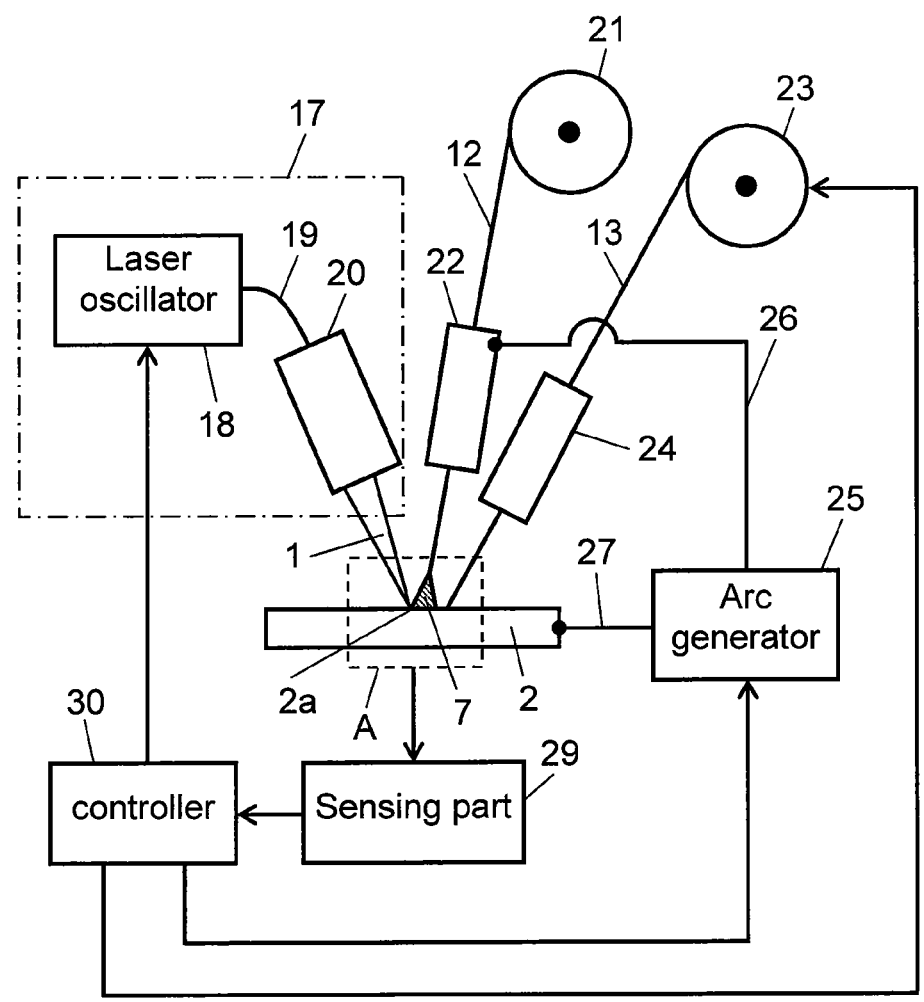
FIG. 7 is a schematic diagram showing an apparatus for hybrid welding according to a third exemplary embodiment of the present invention.
Figure 8:
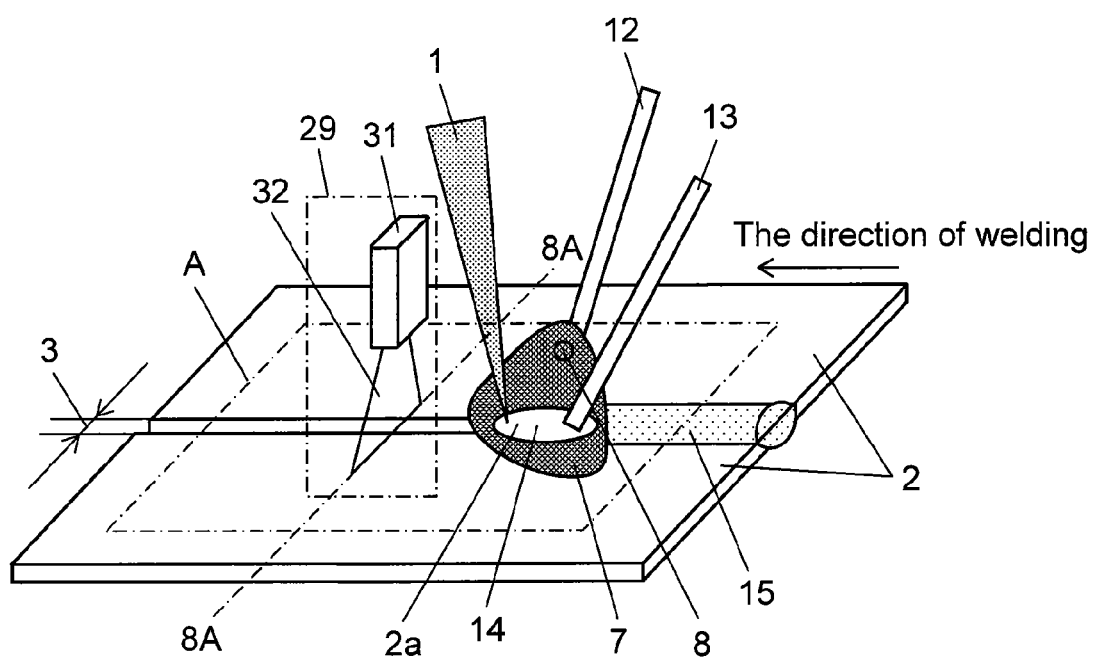
FIG. 8 is a schematic diagram showing the location of the sensing part shown in FIG. 7.

FIG. 7 is a schematic diagram showing an apparatus for hybrid welding according to a third exemplary embodiment of the present invention. FIG. 8 is a schematic diagram showing the location of a sensing part shown in FIG. 7.

The apparatus for hybrid welding of FIG. 7 includes sensing part 29 and controller 30 in place of controller 28 of FIG. 6. Sensing part 29 senses the welding situation of welding position 2a and its vicinity "A", and controller 30 receives a signal from part 29. Controller 30 controls laser generator 17, arc generator 25, and second-wire feeder 23 based on the signal from sensing part 29. Like components are labeled with like reference numerals with respect to FIG. 6 and the following description will be mainly focused on features different from FIG. 6.

The operation of sensing part 29 shown in FIG. 7 will be described as follows with referent to FIG. 8. As shown in FIG. 8, sensing part 29 is composed of sensor unit 31 and optical beam 32. Sensor unit 31 includes a light emitter, which applies optical beam 32 to an arbitrary spot of the butt joint of objects-to-be-welded 2. Optical beam 32 extends along a line 8A-8A, which is perpendicular to the butt joint of objects-to-be-welded 2. Sensor unit 31 also includes a light receiver, which catches and measures the shape of the irradiation position when optical beam 32 hits objects-to-be-welded 2. Sensor unit 31 then calculates the gap between the butting surfaces of objects-to-be-welded 2 based on the measured shape of the irradiation position, and outputs a gap signal to controller 30.

Optical beam 32 extends along the line 8A-8A in the above description, but may alternatively be a spot that is emitted from sensor unit 31 and scanned at high speed along the line 8A-8A. In this case, sensor unit 31 may measure the gap of the butt joint of objects-to-be-welded 2 from the trace of the irradiation position when the spot beam hits objects-to-be-welded 2.

Controller 30 operates as follows. In the actual welding, the butting surfaces of objects-to-be-welded 2 may have a gap therebetween whose size and other conditions are different depending to the position to be welded. Therefore, it is necessary to change the welding conditions depending on the size and other conditions of the gap in order to obtain a good weld bead. In addition to the functions which controller 28 of FIG. 6 has, controller 30 of FIG. 7 has a function of obtaining a fixed-shaped weld bead based on the gap signal received from sensing part 29. The fixed-shaped weld bead is obtained by changing the feeding of second wire 13, the application of laser beam 1, the stop and resumption of the arc welding, or the conditions thereof. As shown in FIG. 8, the direction of the line 8A-8A indicating the irradiation position of optical beam 32 is not exactly the same as the position of molten weld pool 14. The distance between the line 8A-8A and molten weld pool 14 may be previously inputted to controller 30 by referring to the conditions of the actual welding.

As described hereinbefore, in the method for hybrid welding according to the present third exemplary embodiment in which the application of laser beam 1 and arc welding are performed at the same time, second wire 13 is fed to molten weld pool 14 formed by laser beam 1 and arc welding. This increases the deposition rate without increasing the arc current, and achieves a good weld bead even when objects-to-be-welded 2 have gap 3 therebetween.

The first to third exemplary embodiments show the butt welding of objects-to-be-welded 2 having gap 3 therebetween with reference to FIGS. 1 to 8, but the method for hybrid welding according to these exemplary embodiments may be applied to other joints. Also in this case, the deposition rate can be increased without increasing the arc current, and a good weld bead can be obtained even when objects-to-be-welded 2 have gap 3 therebetween.

In the above description, the arrangement of laser beam 1, first wire 12, and second wire 13 is changed in the direction of welding, but may alternatively be changed in the direction perpendicular to the direction of welding. Although not described above, first and second wires 12 and 13 may have the same or different diameters.

Fourth Exemplary Embodiment

In the method and apparatus for hybrid welding according to the first to third exemplary embodiments in which laser welding and arc welding are performed at the same time, the second wire is fed to the molten weld pool so as to adjust the amount of metal to be deposited to the objects to be welded.

Figure 9:
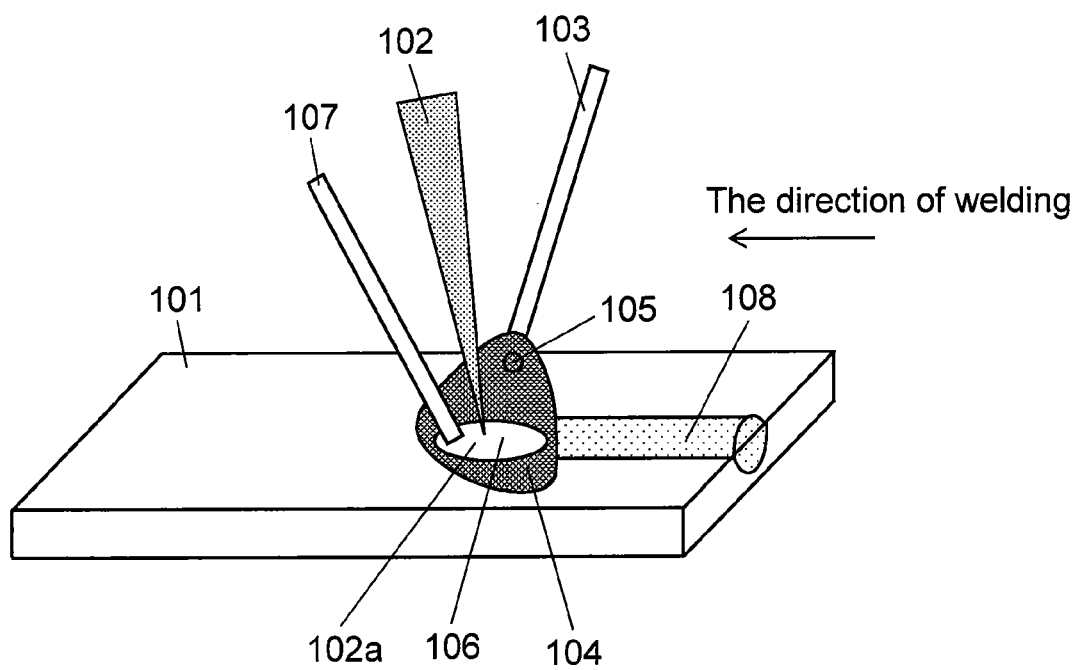
FIG. 9 is another schematic diagram showing the method for hybrid welding according to the first exemplary embodiment of the present invention.
Figure 10:
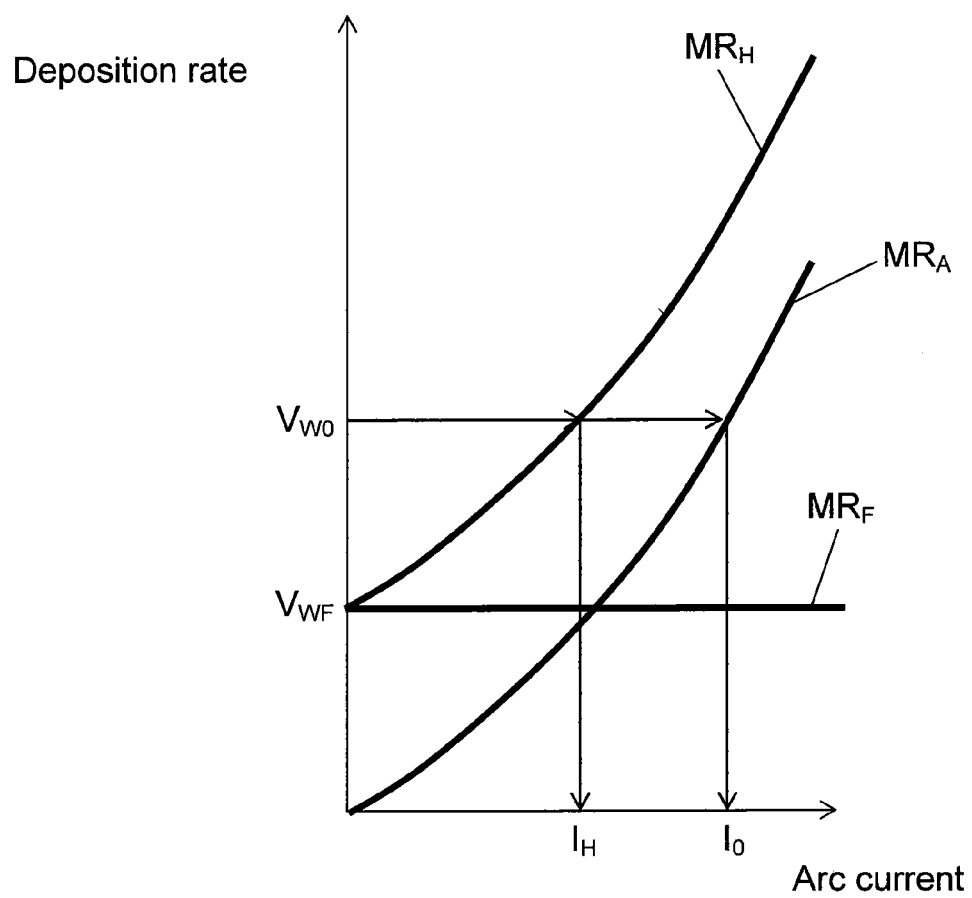
FIG. 10 is a schematic diagram showing the principle of the method for hybrid welding according to the first exemplary embodiment of the present invention.

FIG. 9 is another schematic diagram showing the method for hybrid welding according to the fourth exemplary embodiment. FIG. 10 is a schematic diagram showing the principle of the method for hybrid welding.

As shown in FIG. 9, laser beam 102 is applied to objects-to-be-welded 101, and arc 104 is generated between first wire 103 and objects-to-be-welded 101. First wire 103 is melted to form droplet 105. Laser beam 102 and arc 104 together form molten weld pool 106. Second wire 107 is fed to molten weld pool 106, which solidifies to form bead 108.

FIG. 10 is a schematic diagram showing the principle of the method for hybrid welding and indicating the relation between the deposition rate and the arc current. In FIG. 10, the melting curve $MR_A$ indicates the deposition rate in the conventional consumable electrode arc welding. The melting curve $MR_A$ shows that when the target deposition rate is $V_{W0}$, this deposition rate can be achieved by an arc current of $I_0$.

In the method for hybrid welding according to the fourth exemplary embodiment, on the other hand, when second wire 13 is fed in such a manner as to have the deposition rate $V_{WF}$ shown in the melting curve $MR_F$, the deposition rate follows the melting curve $MR_H$. Therefore, at the target deposition rate $V_{W0}$, the arc current $I_0$ decreases to $I_H$ as shown by the melting curve $MR_H$. Thus, when the deposition rate is equal, this method for hybrid welding can reduce the heat input of the arc welding to $I_H/I_0$, but requires second wire 107 in addition to laser beam 102 and first wire 103. Therefore, at the time of starting and ending welding, it is necessary to determine the sequence of laser beam 102, and first and second wires 103, 107 in such a manner as to obtain good arc starting and a good weld bead shape, 20, respectively.

Figure 11:
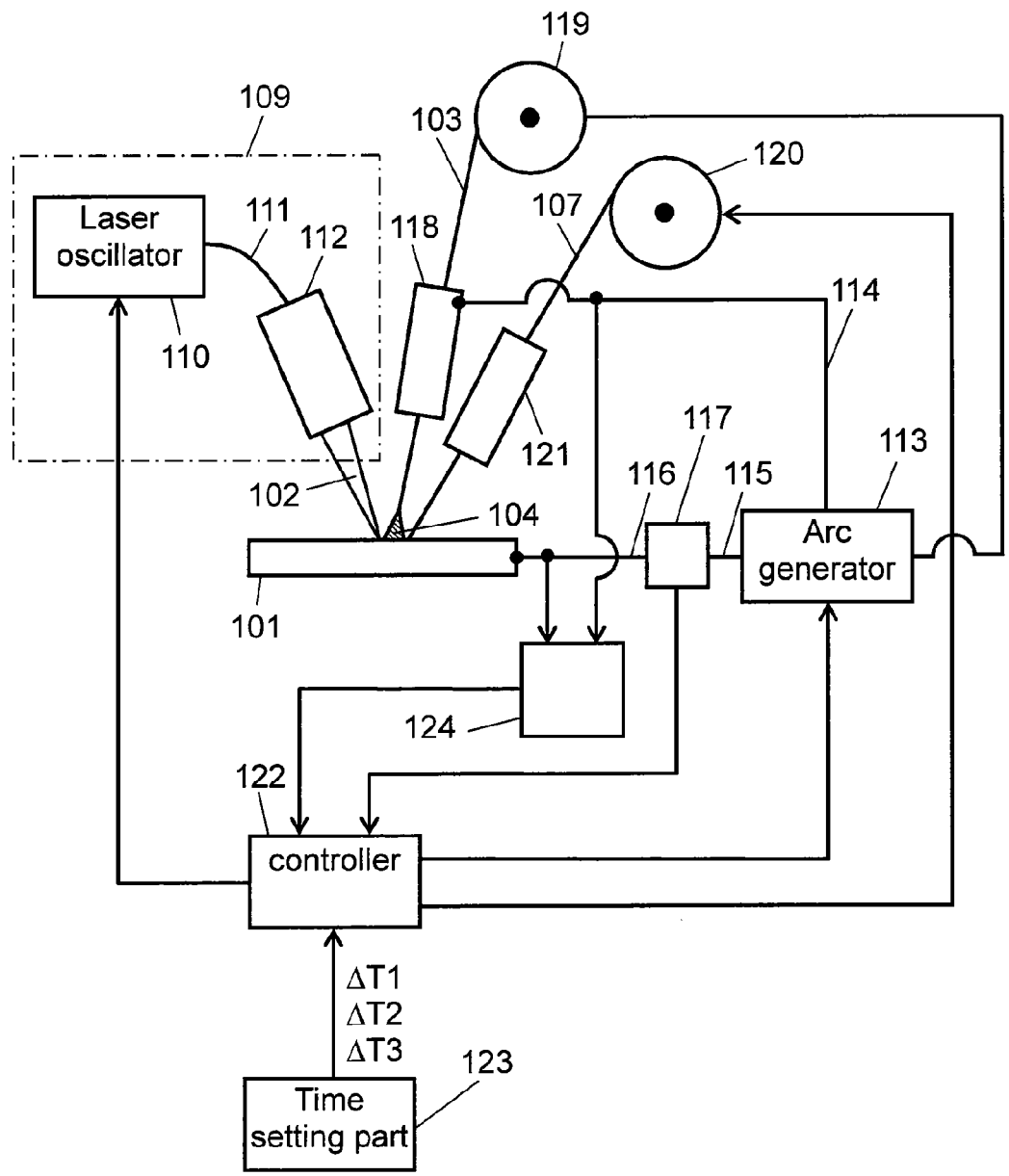
FIG. 11 is a schematic diagram showing an apparatus for hybrid welding according to a fourth exemplary embodiment of the present invention.

FIG. 11 is a schematic diagram showing an apparatus for hybrid welding according to the fourth exemplary embodiment. Like components are labeled with like reference numerals with respect to FIGS. 9 and 10 and the following description will be mainly focused on features different from FIGS. 9 and 10.

The apparatus for hybrid welding shown in FIG. 11 includes laser generator 109, arc generator 113, first-wire feeder 119, second-wire feeder 120, and controller 122. Laser generator 109 includes laser oscillator 110, laser transmitter 111, and light collection optical system 112. Arc generator 113 is connected to current detector 117, first torch 118 for feeding first wire 103, and objects-to-be-welded 101 through cables 115, 114, and 116, respectively. Arc generator 113 supplies electric power to first wire 103 and objects-to-be-welded 101 so as to generate arc 104 therebetween. First-wire feeder 119 feeds first wire 103 to objects-to-be-welded 101 through first torch 118. Second-wire feeder 120 feeds second wire 107 to molten weld pool 106 in objects-to-be-welded 101 through second torch 121. Controller 122 receives an arc voltage detection signal from voltage detector 124 connected to cables 114 and 116, a current detection signal from current detector 117, and predetermined periods ΔT1, ΔT2, and ΔT3 from time setting part 123. Thus, controller 122 controls laser generator 109, arc generator 113, and second-wire feeder 120.

As shown in FIG. 11, laser generator 109 collects laser beam 102 by its light collection optical system 112 and applies it to objects-to-be-welded 101. Optical system 112 may be composed of one or more lenses. Laser transmitter 111 may be an optical fiber or a transmission system composed of a plurality of lenses. Laser oscillator 110 can control its output value and the timing to output the value freely by using an unillustrated external control device. At the time of starting welding, arc generator 113 controls first-wire feeder 119 to feed first wire 103 toward objects-to-be-welded 101. Arc generator 113 also controls first wire 103 and objects-to-be-welded 101 to generate arc 104 therebetween. At the time of ending the welding, arc generator 113 controls first-wire feeder 119 to stop the feeding of first wire 103 and the generation of arc 104.

Current detector 117 may be a shunt connected to cables 115 and 116, or a semiconductor device such as a Hall element. Second-wire feeder 120 can freely control its feed speed and the start and stop of the feeding by using the external control device. Controller 122 may be a computer or composed of a component, a device, an apparatus, or a combination thereof having a calculation function like a computer. Alternatively, controller 122 may be a robot. In this case, although not described in detail, light collection optical system 112, and first and second torches 118, 121 may be fixed to a manipulator of the robot. Voltage detector 124, which is connected to cables 114 and 116 in the above description, is preferably located as close as possible to arc 104 between first wire 103 and objects-to-be-welded 101.

The operation of the apparatus for hybrid welding according to the present fourth exemplary embodiment will be described as follows with reference to FIG. 12.

Figure 12:
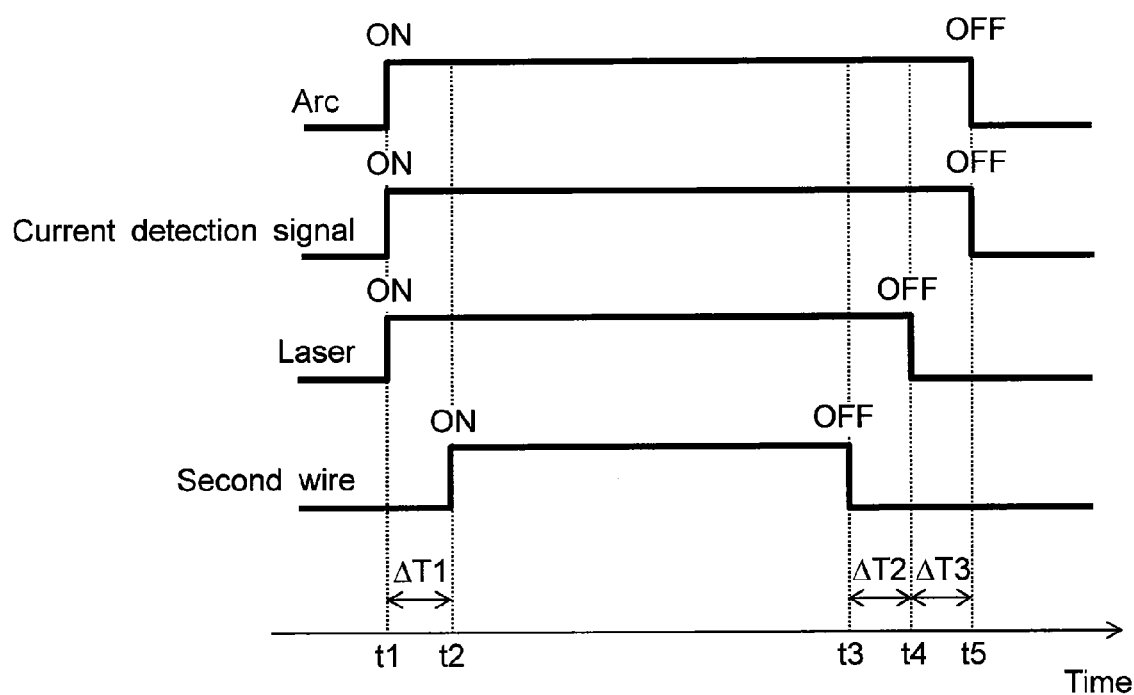
FIG. 12 shows an operation sequence of the apparatus for hybrid welding according to the fourth exemplary embodiment of the present invention.

FIG. 12 shows an operation sequence of the apparatus for hybrid welding according to the fourth exemplary embodiment. At the time of starting welding, upon receiving a command to start welding, controller 122 controls arc generator 113 to feed first wire 103 to welding position 102a from first-wire feeder 119. Controller 122 also controls arc generator 113 to supply electric power required for arc welding to first wire 103 and objects-to-be-welded 101 so as to generate arc 104 therebetween. When first wire 103 comes into contact with objects-to-be-welded 101 and welding current starts to flow, current detector 117 detects the time at which the welding current started to flow and outputs a current detection signal to controller 122 (see the later description of FIG. 15). In FIG. 12, the "ON" of the current detection signal is when the output of the current detection signal is started, and the "OFF" of the current detection signal is when the output is ended.

As shown in FIG. 12, a time t1 is when the current detection signal starts being outputted to controller 122. Immediately upon receiving the current detection signal, controller 122 controls laser generator 109 to start the application of laser beam 102. At time t2 when the predetermined period ΔT1 set by time setting part 123 has passed, controller 122 controls second-wire feeder 120 to start the feeding of second wire 107. From this moment, normal hybrid welding is performed. In the above-described welding start sequence, the application of laser beam 102 can be started immediately upon receiving the current detection signal to provide good arc starting. The predetermined period ΔT1 is provided so that a large enough molten weld pool 106 is formed by laser beam 102 and arc 104.

At the time of ending the welding, on the other hand, immediately upon receiving a command to stop the welding, controller 122 controls second-wire feeder 120 to stop the feeding of second wire 107 at a time t3 shown in FIG. 12. At a time t4 when the predetermined period ΔT2 has passed, controller 122 controls laser generator 109 to stop the application of laser beam 102. At a time t5 when the predetermined period ΔT3 has passed, controller 122 controls arc generator 113 to stop the feeding of first wire 103, and the arc welding using arc 104. In the above-described welding end sequence, the application of laser beam 102 or the arc welding is ended after the feeding of second wire 107 is stopped. This prevents second wire 107 from plunging into molten weld pool 106, thereby achieving a good weld bead shape.

As described hereinbefore, the apparatus for hybrid welding according to the present fourth exemplary embodiment uses the following method for hybrid welding. In this apparatus, laser beam 102 is applied to welding position 102a of objects-to-be-welded 101, and at the same time, first wire 103 is fed to welding position 102a so as to perform arc welding using an arc generated between objects-to-be-welded 101 and first wire 103. In this apparatus for hybrid welding, second wire 107 is fed to molten weld pool 106 formed by laser beam 102 and the arc welding. In addition, at the time of starting welding, the feeding of second wire 107 is started when a predetermined period has passed since the application of laser beam 102 and/or the arc welding is started. At the time of ending the welding, the application of laser beam 102 is stopped when a predetermined period has passed since the feeding of second wire 107 is stopped, and then the arc welding is stopped when a predetermined period has passed since the application of laser beam 102 is stopped. As a result, good arc starting and a good weld bead shape can be obtained.

In the above-described operation of the apparatus for hybrid welding according to the present fourth exemplary embodiment, the operation sequence of FIG. 12 can be combined with welding travel to provide effects similar to above, which will be described as follows with reference to FIG. 13.

Figure 13:
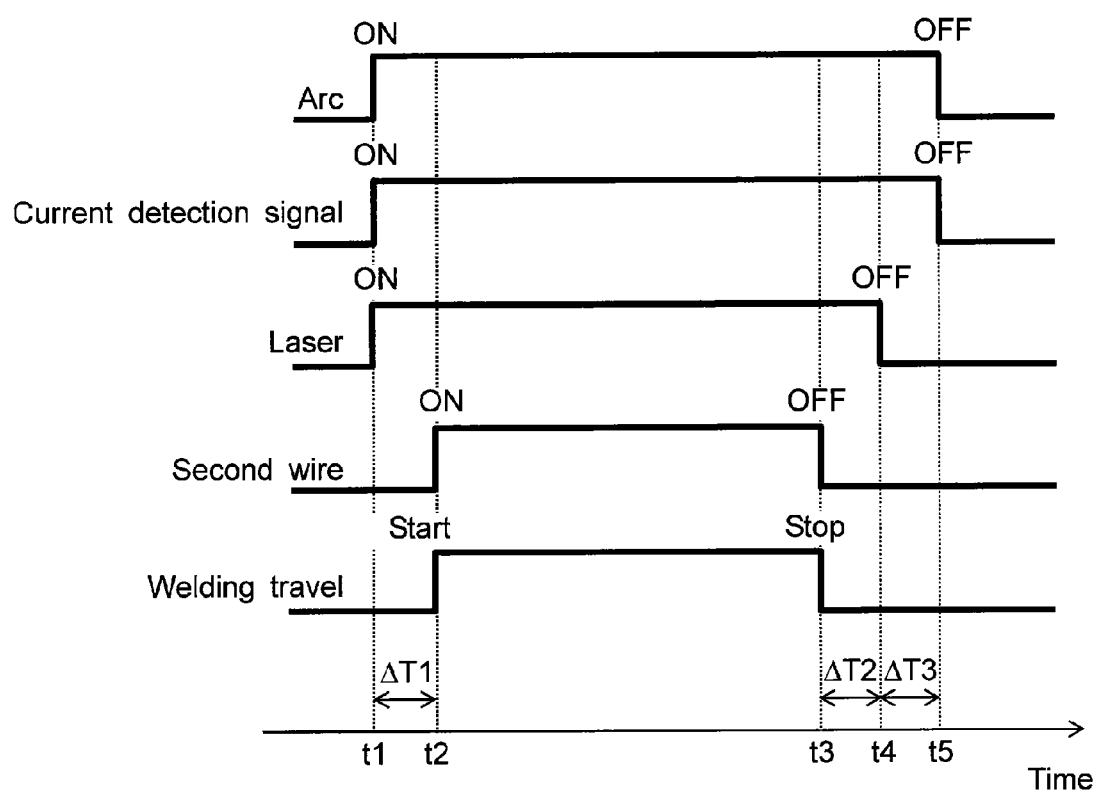
FIG. 13 shows another operation sequence of the apparatus for hybrid welding according to the fourth exemplary embodiment of the present invention.

FIG. 13 shows another operation sequence of the apparatus for hybrid welding according to the fourth exemplary embodiment. In a welding traveler, which is omitted in FIG. 11, welding travel may be performed by using a robot to whose manipulator light collection optical system 112 and first and second torches 118, 121 are fixed. Obviously, it is possible to perform welding by fixing light collection optical system 112 and first and second torches 118, 121 to a mobile device other than a robot. At the time of starting welding, the welding traveler starts to travel at the time t2 when the predetermined period ΔT1 has passed since the time t1. At the time of ending the welding, the welding travel is ended at the time t3 when the feeding of second wire 107 is stopped as shown in FIG. 13.

The reason for using the above-described operation sequence is as follows. At the time of starting welding, welding position 102a of objects-to-be-welded 101 is not heated yet. Therefore, to ensure the spread and penetration of the bead in welding position 102a, in a general welding sequence, the torch or the laser head is kept in the position for a while after welding is started. Unlike the subsequent region that is welded in a normal manner, this region is fed with deposited metal of first wire 103 and is deposited with the metal. If this region is further fed with second wire 107, too much deposited metal spoils the appearance of the bead. This is why it is preferable to feed second wire 107 after the welding travel is started.

At the time of ending the welding, on the other hand, in the conventional arc welding, the welding travel is stopped when a predetermined welding position is reached, and a crater treatment is performed at the position. The apparatus for hybrid welding of the present fourth exemplary embodiment requires a crater treatment in the same manner as the conventional arc welding. A crater treatment can be generally performed with only deposited metal of first wire 103, so that it is unnecessary to feed second wire 107 of FIG. 13 to obtain a good appearance of the bead.

In the apparatus for hybrid welding of the present fourth exemplary embodiment, the operation shown in FIG. 14 can provide effects similar to above as will be described as follows.

Figure 14:
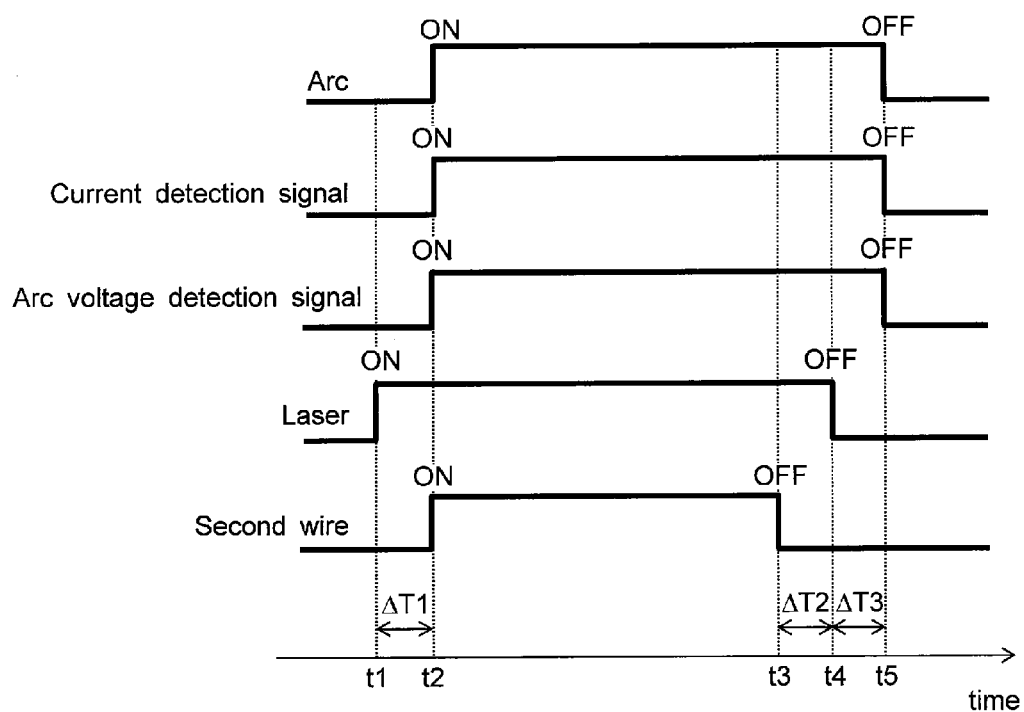
FIG. 14 shows another operation sequence of the apparatus for hybrid welding according to the fourth exemplary embodiment of the present invention.

FIG. 14 shows another operation sequence of the apparatus for hybrid welding according to the fourth exemplary embodiment. At the time of starting welding, immediately upon receiving a command to start welding, controller 122 controls laser generator 109 to start the application of laser beam 102 at the time t1 of FIG. 14. At the time t2 when the predetermined period ΔT1 has passed, controller 122 controls arc generator 113 to feed first wire 103 to the welding position from first-wire feeder 119. Controller 122 also controls arc generator 113 to supply electric power required for arc welding to first wire 103 and objects-to-be-welded 101 so as to generate arc 104 therebetween. When first wire 103 comes into contact with objects-to-be-welded 101 and welding current starts to flow, current detector 117 detects the time at which the welding current started to flow, and outputs a current detection signal to controller 122 (see the later description of FIG. 15).

In voltage detector 124, on the other hand, the welding current starts to flow, and arc 104 is generated from the tip of first wire 103 which is in contact with objects-to-be-welded 101. Voltage detector 124 detects the generation of arc 104 and outputs an arc voltage detection signal (see the later description of FIG. 15) to controller 122. Immediately upon receiving a welding current detection signal and an arc voltage signal, controller 122 controls second-wire feeder 120 to start the feeding of second wire 107. The subsequent operation will not be described here because it is the same as the operation sequence of FIGS. 12 and 13.

The current detection signal and the arc voltage detection signal in the operation sequence shown in FIGS. 12 to 14 will be briefly described as follows with reference to FIG. 15.

Figure 15:
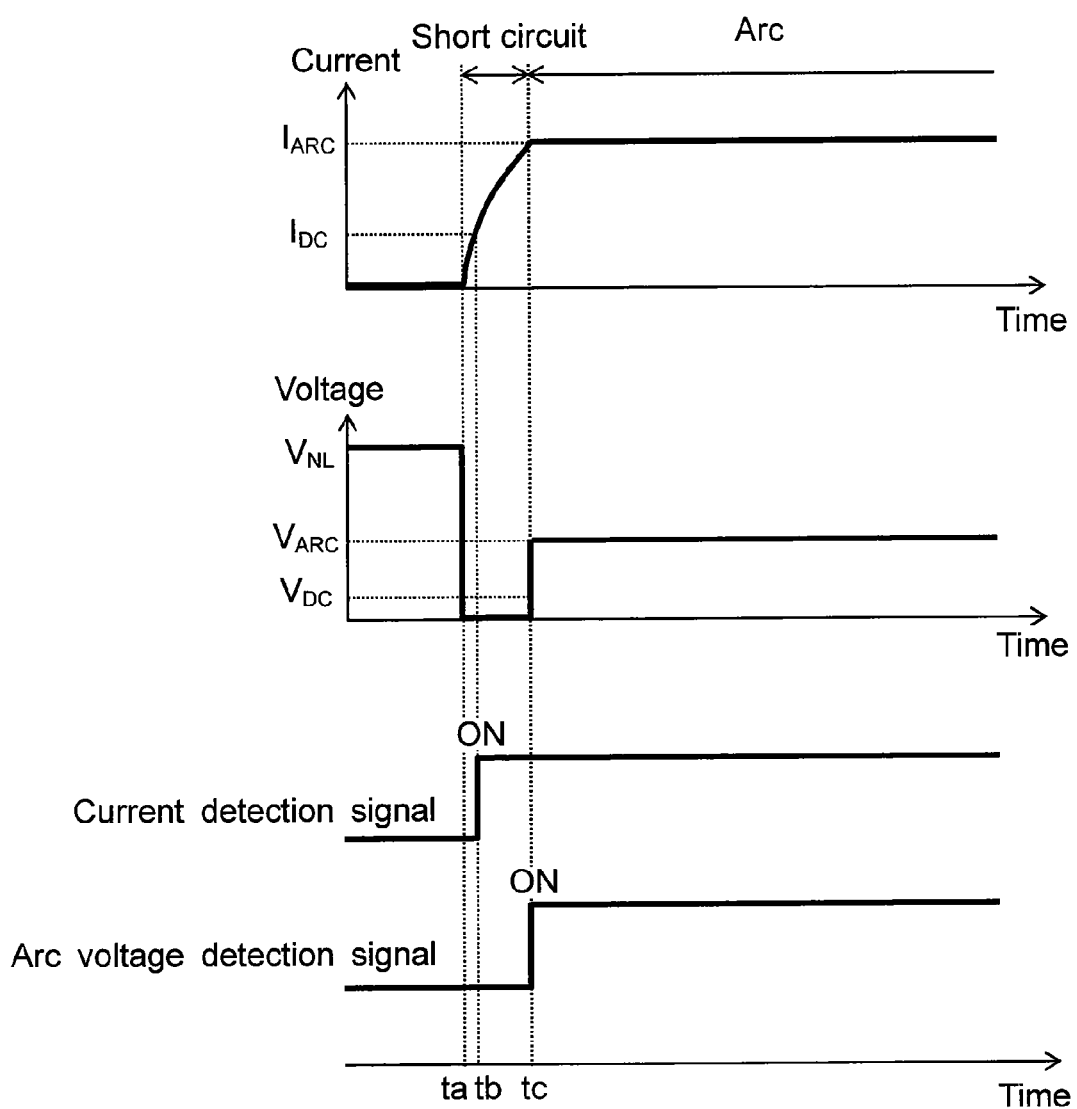
FIG. 15 is a schematic diagram showing the output timings of a current detection signal and an arc voltage detection signal.

FIG. 15 is a schematic diagram showing the output timings of the current detection signal and the arc voltage detection signal. In FIG. 15, times ta, tb, and tc correspond to the time t1 in FIGS. 12, 13, and the time t2 in FIG. 14, and are extended along the temporal axis. The interval until the time ta is when arc generator 113 is outputting electric power, and first wire 103 is being fed toward welding position 102a of objects-to-be-welded 101 to come into contact therewith. During this period, a current of zero amperes flows through first wire 103, but a no-load voltage $V_{NL}$ is applied across first wire 103 and objects-to-be-welded 101. At the time ta, first wire 103 comes into contact with objects-to-be-welded 101, but the voltage across them is substantially zero volts. Between the times ta and tc, a larger current flows through first wire 103, and its tip is heated, but arc 104 has not been generated yet. This period is a short-circuit period. As shown in FIG. 15, at the time tb when the current flowing through first wire 103 has reached a predetermined current detection level $I_{DC}$, current detector 117 outputs the current detection signal to controller 122. At the time tc, arc 104 is generated from the tip of first wire 103, and arc current $I_{ARC}$ starts to flow, thereby applying an arc voltage $V_{ARC}$ across first wire 103 and objects-to-be-welded 101. Although not illustrated, voltage detector 124 outputs the arc voltage detection signal to controller 122 when the voltage applied across first wire 103 and objects-to-be-welded 101 reaches a predetermined voltage detection level $V_{DC}$. In general arc welding, the period between the times to and tc is very short, so that both the current detection signal and the arc voltage detection signal are shown at the time t2 in FIG. 14.

In FIGS. 12 to 14, the application of laser beam 102 is continued for the predetermined period ΔT2 even after the feeding of second wire 107 is stopped, but the predetermined period ΔT2 may alternatively be zero seconds. In either case, it is preferable that the crater treatment is performed in the predetermined period ΔT3.

In the above description, at the time of starting welding, the feeding of second wire 107 may be started when a predetermined period has passed since the application of laser beam 102 and/or the arc welding is started, or since the application of laser beam 102 and the arc welding are both started. It is alternatively possible that the application of laser beam 102 is started immediately upon detection of the start of arc welding and the flowing of an arc current, and when a predetermined period has passed since then, the feeding of second wire 107 is started. It is alternatively possible that arc welding is started when a predetermined period has passed since the application of laser beam 102 is started, and when a predetermined period has passed since then, the feeding of second wire 107 is started. It is alternatively possible that arc welding is started when a predetermined period has passed since the application of laser beam 102 is started, and immediately after an arc discharge is started, the feeding of second wire 107 is started.

At the time of ending the welding, it is possible that the application of laser beam 102 and the arc welding are stopped when a predetermined period has passed since the feeding of second wire 107 is stopped. It is alternatively possible that the application of laser beam 102 is stopped when a predetermined period has passed since the feeding of second wire 107 is stopped, and when a predetermined period has passed since then, the arc welding stopped. It is alternatively possible that the feeding of second wire 107 is stopped when a predetermined period has passed since the application of laser beam 102 is stopped, and when a predetermined period has passed since then, the arc welding is stopped. It is alternatively possible that the feeding of second wire 107 is stopped when a predetermined period has passed since the arc welding is stopped, and when a predetermined period has passed since then, the application of laser beam 102 is stopped. It is possible to make both the output of laser beam 102 and the feed speed of second wire 107 after the arc welding is stopped lower than their levels used for the welding so far.

The arc welding may be pulse MIG arc welding, and the laser beam generator may be at least one of a YAG laser, a semiconductor laser, and a fiber laser.

The objects-to-be-welded and the first and second wires may be made of an aluminum alloy, iron, or steel.

INDUSTRIAL APPLICABILITY

As described hereinbefore, according to the method and apparatus for hybrid welding of the present invention, one or more second wires are fed to a molten weld pool formed by a laser beam and arc welding, thereby increasing the deposition rate without increasing the arc current. With this method and apparatus for hybrid welding, various metals or other materials can be welded to obtain a good weld bead shape.

REFERENCE MARKS IN THE DRAWINGS 1, 102 laser beam
2, 101 objects-to-be-welded
2a, 102a welding position
3 gap
4, 10, 15, 108 bead
5, 11 burn-through
6 wire
7, 104 arc
8, 105 droplet
9, 14, 106 molten weld pool
12, 103 first wire
13, 107 second wire
16 composite nozzle
17, 109 laser generator
18, 110 laser oscillator
19, 111 laser transmitter
20, 112 light collection optical system
21, 119 first-wire feeder
22, 118 first torch
23, 120 second-wire feeder
24, 121 second torch
25, 113 arc generator
26, 27, 114, 115, 116 cable
28, 30, 122 controller
29 sensing part
31 sensor unit
32 optical beam
117 current detector
123 time setting part
124 voltage detector

The invention claimed is:

1. A method for hybrid welding, the method comprising:
applying a laser beam to a welding position of objects to be welded so as to perform a laser welding, and simultaneously feeding a first wire with a first deposition rate to the welding position so as to perform an arc welding using an arc generated between the objects to be welded and the first wire according to a first arc current;
feeding a second wire with a second deposition rate to a molten weld pool formed in the welding position by the laser welding and the arc welding without performing arc welding using an arc, and having no arc current on the second wire,
wherein the objects to be welded, the first wire, and the second wire are made of an aluminum alloy.

2. The method of claim 1, wherein
the arc welding uses a shielding gas which is supplied through a first nozzle of a first torch for feeding at least one of the first wire and a second nozzle of a second torch for feeding the second wire; and
the shielding gas is supplied or stopped individually between the first nozzle and the second nozzle according to the welding area.

3. The method of claim 2, wherein
when the shielding gas is stopped or resumed, at least one of laser beam application conditions and arc welding conditions are changed.

4. The method of claim 1, wherein
the second wire is stopped from being fed depending on the welding area.

5. The method of claim 1, wherein
the application of at least one of the laser beam and the arc welding is stopped depending on the welding area.

6. The method of claim 1, wherein
at least one of a) the feed speed of the second wire and b) the welding speed is changed depending on the welding area.

7. The method of claim 1, wherein
at the time of starting welding, the application of the laser beam is started immediately upon detection of the start of arc welding and the flowing of an arc current, and when a predetermined period has passed since then, the feeding of the second wire is started.

8. The method of claim 1, wherein
at the time of starting welding, the arc welding is started when a predetermined period has passed since the application of the laser beam is started, and when a predetermined period has passed since then, the feeding of the second wire is started.

9. The method of claim 1, wherein
at the time of ending the welding, the application of the laser beam and the arc welding are stopped when a predetermined period has passed since the feeding of the second wire is stopped.

10. The method of claim 1, wherein
at the time of ending the welding, the application of the laser beam is stopped when a predetermined period has passed since the feeding of the second wire is stopped, and when a predetermined period has passed since then, the arc welding is stopped.

11. An apparatus for hybrid welding comprising:
a laser generator for applying a laser beam to a welding position of objects to be welded;
a first-wire feeder for feeding a first wire with a first deposition rate to the welding position via a first torch according to a first arc current;
an arc generator for supplying electric power required for arc welding to the first wire and the objects to be welded;
a second-wire feeder for feeding the second wire with a second deposition rate to the welding position via a second torch; and
a controller for controlling the laser generator, the arc generator, and the second-wire feeder, wherein
the second wire is fed to a molten weld pool formed by the arc welding and the laser beam, the molten weld pool being formed in an area between the first wire and the objects to be welded without performing arc welding of the second wire and having no arc current on the second wire; and
the objects to be welded, the first wire, and the second wire contain aluminum as a principal component.

12. The apparatus of claim 11, wherein
a shielding gas is supplied through at least one of a first nozzle of the first torch for feeding the first wire and a second nozzle of the second torch for feeding the second wire; and
the shielding gas is supplied or stopped individually between the first nozzle and the second nozzle according to the welding area.

13. The apparatus of claim 12, wherein
when the shielding gas is stopped or resumed, at least one of laser beam application conditions and arc welding conditions are changed.

14. The apparatus of claim 11, wherein,
the second wire is stopped from being fed depending on the welding area.

15. The apparatus of claim 11, wherein
the application of the laser beam and the arc welding is stopped depending on the welding area.

16. An apparatus for hybrid welding comprising:
a laser generator for applying a laser beam to a welding position of objects to be welded;
a first-wire feeder for feeding a first wire with a first deposition rate to the welding position via a first torch according to a first arc current;
a second-wire feeder for feeding a second wire with a second deposition rate to the welding position via a second torch without performing arc welding of the second wire and having no arc current on the second wire;
an arc generator for controlling the first-wire feeder, and supplying electric power required for arc welding to the first wire and the objects to be welded; and
a controller for receiving predetermined periods: $\Delta T1$, $\Delta T2$, and $\Delta T3$ from a time setting part and a current detection signal from a current detector, thereby controlling the laser generator, the arc generator, and the second-wire feeder, wherein
at the time of starting welding, the controller performs the following:
controlling the arc generator to start arc welding;
controlling the laser generator to start the application of the laser beam immediately upon receiving the current detection signal; and
controlling the second-wire feeder to start the feeding of the second wire when the predetermined period $\Delta T1$ has passed and,
at the time of ending the welding, the controller performs the following:
ending the application of the laser beam when the predetermined period $\Delta T2$ has passed since the feeding of the second wire is stopped; and
ending the arc welding when the predetermined period $\Delta T3$ has passed since the application of the laser beam is ended.

17. The apparatus of claim 16, wherein
welding travel is started when the predetermined period $\Delta T1$ is ended; and
welding travel is stopped when the second wire is stopped.

18. The method of claim 1, further comprising:
increasing the first deposition rate to a third deposition rate according to the second deposition rate; and
decreasing the first arc current to a second arc current, wherein the second deposition rate is constant.

19. The apparatus of claim 11, wherein
the first deposition rate is maintained according to the second deposition rate being constant and by decreasing the first arc current to a second arc current.

20. The apparatus of claim 16, wherein
the first deposition rate is maintained according to the second deposition rate being constant and by decreasing the first arc current to a second arc current.

21. The method of claim 1, wherein the first-wire is a consumable electrode.

22. The apparatus of claim 11, wherein the first-wire is a consumable electrode.

23. The apparatus of claim 16, wherein the first-wire is a consumable electrode.

* * * * *